(12) United States Patent
Huang

(10) Patent No.: US 11,942,062 B2
(45) Date of Patent: Mar. 26, 2024

(54) FRAME RATE ADJUSTING METHOD AND APPARATUS FOR DISPLAY SCREEN, TERMINAL, AND STORAGE MEDIUM

(71) Applicant: ONEPLUS TECHNOLOGY (SHENZHEN) CO., LTD., Shenzhen (CN)

(72) Inventor: Nanyan Huang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/848,777

(22) Filed: Jun. 24, 2022

(65) Prior Publication Data

US 2022/0319470 A1 Oct. 6, 2022

Related U.S. Application Data

(63) Continuation of application No. PCT/CN2020/135713, filed on Dec. 11, 2020.

(30) Foreign Application Priority Data

Dec. 26, 2019 (CN) .......................... 201911367128.0

(51) Int. Cl.
*G09G 5/34* (2006.01)

(52) U.S. Cl.
CPC ....... *G09G 5/34* (2013.01); *G09G 2340/0435* (2013.01); *G09G 2354/00* (2013.01)

(58) Field of Classification Search
CPC ....................................................... G09G 5/34
See application file for complete search history.

(56) References Cited

U.S. PATENT DOCUMENTS

2010/0094931 A1   4/2010   Hosur et al.

FOREIGN PATENT DOCUMENTS

| CN | 102883217 A | 1/2013 |
| CN | 104951266 A | 9/2015 |

(Continued)

OTHER PUBLICATIONS

Peng Deliang, Frame rate control method and device, Machine Translation.*

(Continued)

*Primary Examiner* — Gustavo Polo
(74) *Attorney, Agent, or Firm* — Sheppard, Mullin, Richter & Hampton LLP (57) ABSTRACT

Provided are a frame rate adjusting method and apparatus for a display screen, a terminal, and a storage medium. The method includes: obtaining (S110), in response to detecting a swiping operation, a screen scrolling speed; in response to the screen scrolling speed satisfying a predetermined frame-rate-adjustment condition, obtaining (S120) a current frame rate of a screen, a predetermined target frame rate, and a screen scrolling time length corresponding to the swiping operation; determining a current frame period based on the current frame rate, and determining a target frame period based on the predetermined target frame rate (S130); determining (S140) a frame period change based on the current frame period, the target frame period, and the screen scrolling time length; and adjusting (S150) the current frame rate of the screen based on the frame period change during a screen scrolling period.

18 Claims, 5 Drawing Sheets

(56) References Cited

FOREIGN PATENT DOCUMENTS

| CN | 105117191 A | 12/2015 |
|---|---|---|
| CN | 105491461 A | 4/2016 |
| CN | 106027942 A | 10/2016 |
| CN | 108628562 A | 10/2018 |
| CN | 109243376 A | 1/2019 |
| CN | 109640168 A | 4/2019 |

OTHER PUBLICATIONS

First Office Action from corresponding Chinese Application No. 201911367128.0, dated Jul. 28, 2022. English translation attached.
International Search Report and Written Opinion dated Mar. 17, 2021 in International Application No. PCT/CN2020/135713. English translation attached.
The Rejection Decision from corresponding Chinese Application No. 201911367128.0, dated Mar. 31, 2023. English translation attached.

\* cited by examiner

FRAME RATE ADJUSTING METHOD AND APPARATUS FOR DISPLAY SCREEN, TERMINAL, AND STORAGE MEDIUM

CROSS REFERENCE

The present application is a continuation of International Application No. PCT/CN2020/135713 filed on Dec. 11, 2020, which claims priority to Chinese Patent Application No. 201911367128.0, entitled "FRAME RATE ADJUSTING METHOD AND APPARATUS FOR DISPLAY SCREEN, TERMINAL, AND STORAGE MEDIUM", filed with China National Intellectual Property Administration on Dec. 26, 2019, the entire disclosure of which is incorporated herein by reference.

TECHNICAL FIELD

The present disclosure relates to the field of screen display technologies, and more particularly, to a frame rate adjusting method and apparatus for a display screen, a terminal, and a storage medium.

BACKGROUND

In Android's native design, a software Vertical Synchronization (Vsync) signal is transmitted by a DispSync thread of a SurfaceFlinger process to simulate hardware Vsync. The essence of Vsync is to wake up AppEventThread and SFEventThread every once in a while to make them work. The software-emulated Vsync issued by DispSync can control Vsync signals easily. For example, an application thread and SFEventThread may work at a certain tempo but staggered in time. Working in the tempo of one after the other also realizes staggered work peaks of a Central Processing Unit (CPU), thereby improving performance of the CPU.

In the related art of a display screen, a frame rate is usually a fixed value, which is prone to unnecessary power wastes when display contents change rapidly on a screen. Therefore, a control method for the frame rate of the display screen cannot meet diversified needs of users.

SUMMARY

A frame rate adjusting method for a display screen is provided. The method includes: obtaining, in response to detecting a swiping operation, a screen scrolling speed corresponding to an end time point of the swiping operation; in response to the screen scrolling speed satisfying a predetermined frame-rate-adjustment condition, obtaining a current frame rate of a screen, a predetermined target frame rate, and a screen scrolling time length corresponding to the swiping operation; determining a current frame period based on the current frame rate, and determining a target frame period based on the predetermined target frame rate; determining a frame period change based on the current frame period, the target frame period, and the screen scrolling time length; and adjusting the current frame rate of the screen based on the frame period change during a screen scrolling period.

A terminal is provided. The terminal includes: a memory having a computer program stored thereon; and a processor. The processor, when executing the computer program, implements the steps of the method as described above.

A non-transitory computer-readable storage medium is provided. The computer-readable storage medium stores a computer program. The computer program, when executed by a processor, implements the steps of the method as described above.

DESCRIPTION OF EMBODIMENTS

In order to make the objects, technical solutions, and advantages of the present disclosure more apparent, the present disclosure will be described in detail below with reference to the accompanying drawings and embodiments. It should be understood that specific embodiments described here are only used to explain, rather than limiting, the present disclosure.

Figure 1:
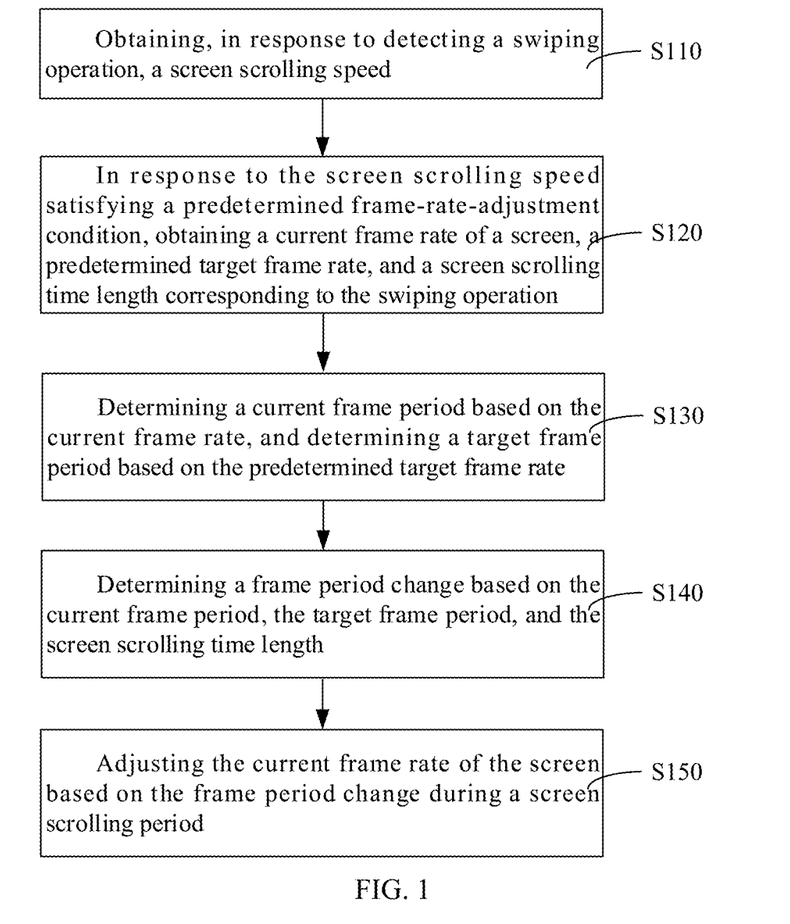
FIG. 1 is a schematic flowchart illustrating a frame rate adjusting method for a display screen according to an embodiment.

The present disclosure provides a frame rate adjusting method for a display screen. In an embodiment, the frame rate adjusting method for the display screen provided by the present disclosure may be applied in a terminal. The terminal obtains, in response to detecting a swiping operation, a screen scrolling speed. When the screen scrolling speed satisfies a predetermined frame-rate-adjustment condition, the terminal calculates and obtains a frame period change based on an obtained current frame rate, a predetermined target frame rate, and a screen scrolling time length. The terminal adjusts the current frame rate of the display screen based on the frame period change during a screen scrolling period. As illustrated in FIG. 1, the frame rate adjusting method for the display screen includes actions at blocks S110 to S150.

At block S110, a screen scrolling speed corresponding to an end time point of the swiping operation is obtained in response to detecting a swiping operation.

At block S120, a current frame rate of a screen, a predetermined target frame rate, and a screen scrolling time length corresponding to the swiping operation are obtained in response to the screen scrolling speed satisfying a predetermined frame-rate-adjustment condition.

Here, the swiping operation is usually performed by a user with a finger or other media. When a display content in the screen supports scrolling, the terminal may make, in response to detecting the swiping operation, a scrolling response based on a direction corresponding to the swiping operation. The display content in the screen scrolls in the direction of the swiping operation. Different speeds of swiping operations correspond to different screen scrolling speeds responding to the swiping operations.

The screen is also called the display screen, which is an appliance used to display images and colors. The frame rate is a frequency (rate) at which bitmaps in frames consecutively appear on the display screen. Usually, the terminal controls a display of the display screen at a fixed frame rate under normal display conditions (without adjusting the frame rate of the display screen). In this embodiment, when the screen scrolling speed is detected to satisfy the predetermined frame-rate-adjustment condition, a frame rate at which the screen is currently displayed is obtained and recorded as the current frame rate. In the embodiments of the present disclosure, the frame rate refers to a screen refresh rate, i.e., an image refresh rate of application software.

The predetermined target frame rate is a predetermined target value to which the frame rate is expected to be adjusted when the screen scrolling speed satisfies the predetermined frame-rate-adjustment condition. In an embodiment, the predetermined target frame rate may be smaller than or greater than the current frame rate. Further, the predetermined target frame rate is determined based on the current frame rate and the screen scrolling speed. For example, when the current frame rate is high and the screen scrolling speed is fast, the display content on the screen may be controlled to be displayed at a target frame rate lower than the current frame rate during fast scrolling of the screen. For another example, when the current frame rate is low and the screen scrolling speed is slow, the display content on the screen may be controlled to be displayed at a target frame rate higher than the current frame rate during slow scrolling of the screen. In an embodiment, when the current frame rate is high and the screen scrolling speed is fast, the obtained predetermined target frame rate is a minimum frame rate of the display screen supportable by the terminal in question. In another embodiment, when the current frame rate is low and the screen scrolling speed is slow, the obtained predetermined target frame rate is a maximum frame rate of the display screen supportable by the terminal in question. Here, the predetermined frame-rate-adjustment condition may be set as desired.

In an embodiment, when the screen scrolling speed is detected to be greater than a first speed threshold, it is determined that the screen scrolling speed satisfies the predetermined frame-rate-adjustment condition. Alternatively, in another embodiment, when the screen scrolling speed is smaller than a second speed threshold at an end of the swiping operation, it is determined that the screen scrolling speed satisfies the predetermined frame-rate-adjustment condition. Here, the first speed threshold is greater than the second speed threshold.

In another embodiment, the predetermined target frame rate is determined by the terminal in question. That is, the predetermined target frame rate is a maximum screen display frame rate or a minimum screen display frame rate supportable by the terminal in question. In an embodiment, assuming that the current frame rate is high and needs to be lowered, the obtained predetermined target frame rate is a minimum frame rate supportable by the terminal in question; and similarly, assuming that the current frame rate is low and needs to be raised, the obtained predetermined target frame rate is a maximum frame rate supportable by the terminal in question.

When the swiping operation is detected, the terminal may control the screen to start scrolling. The screen scrolling speed and the screen scrolling time length are determined by a system of the terminal at a time point when the screen starts scrolling (e.g., a time point when the user's finger leaves the screen). In an embodiment, when the swiping operation is detected, the screen scrolling speed corresponding to the swiping operation is obtained. When the screen scrolling speed satisfies the predetermined frame-rate-adjustment condition, the screen scrolling time length also needs to be obtained for subsequent calculation. In an embodiment, the screen scrolling time length is a time length corresponding to an interval between a time point when the user's finger leaves the screen and a time point when the scrolling ends.

At block S130, a current frame period is determined based on the current frame rate, and a target frame period is determined based on the predetermined target frame rate.

Here, a frame period is a time interval between two frames. The frame rate and the frame period are inversely proportional to each other. It should be understood that a frame rate corresponding to a frame period decreases as the frame period increases. In this embodiment, a frame period corresponding to the current frame rate is recorded as the current frame period, and a frame period corresponding to the predetermined target frame rate is recorded as the target frame period. In an embodiment, the frame period is a time interval in ms between two software Vsync signals. A relationship between the frame rate (in Frames Per Second, FPS) and the frame period (represented by period) may be expressed as FPS=1,000/period. In an embodiment, a frame rate of 60 Hz corresponds to a frame period of approximately 16.666 ms; and a frame rate of 90 Hz corresponds to a frame period of approximately 11.111 ms.

At block S140, a frame period change is determined based on the current frame period, the target frame period, and the screen scrolling time length.

In this embodiment, the frame rate needs to be adjusted when the screen scrolling speed satisfies a predetermined frame rate adjustment. The frame rate may be adjusted by adjusting the frame period. A way for determining a frame rate adjustment based on the current frame period, the target frame period, and the screen scrolling time length at block S140 may be expressed as calculating the frame period change.

In an embodiment, a way for calculating the frame period change based on the current frame period, the target frame period, and the screen scrolling time length may be obtained based on a relationship between the target frame period and the current frame period, a frame period change to be determined, and a number of frames to be displayed during the screen scrolling period and a relationship between the screen scrolling time length and the current frame period and a frame period change to be determined.

Further, the relationship between the target frame period and the current frame period, the frame period change to be determined, and the number of frames to be displayed during the screen scrolling period may be expressed as: target frame period=current frame period−frame period change to be determined*(number of frames to be displayed−1). A relationship between the screen scrolling time length and the current frame period and an unknown target frame period change may be expressed as: screen scrolling time length=a sum of frame periods of respective frames during the screen scrolling period. Here, a way for determining each frame period may be expressed as: i-th frame period during the screen scrolling period=the current frame period−frame period to be determined*(i−1). Therefore, the relationship between the screen scrolling time length and the current frame period and the unknown target frame period change may be expressed as: screen scrolling time length=current frame period+(current frame period−frame period to be determined)+ . . . +(current frame period−frame period to be determined*(number of frames to be displayed−1)).

Further, in an embodiment, determining the frame period change based on the relationship between the target frame period and the current frame period, the frame period change to be determined, and the number of frames to be displayed during the screen scrolling period and the relationship between the screen scrolling time length and the current frame period and the frame period change to be determined (determining the frame period change based on the current frame period, the target frame period, and the screen scrolling time length) includes: calculating a difference between a square of the current frame period and a square of the target frame period; calculating a product of the screen scrolling time length and 2, and subtracting the current frame period and the target frame period from the product to obtain a difference; and determining a ratio of the difference between the squares to the difference as the frame period change.

At block S150, the current frame rate of the screen is adjusted based on the frame period change during a screen scrolling period.

Here, the screen scrolling period includes a time period between a scrolling start time point of the screen and a scrolling end time point of the screen. The frame period change is determined at block S140. Adjusting a frame rate of the screen based on the frame period change may be adjusting a frame period based on the frame period change, thereby achieving an effect of adjusting the current frame rate. Since the frame period is inversely proportional to the frame rate, adjusting the frame period based on the frame period change may achieve the effect of adjusting the current frame rate.

Further, in an embodiment, adjusting the current frame rate of the screen based on the frame period change during the screen scrolling period includes adjusting, frame by frame, the current frame period corresponding to the current frame rate of the screen based on the frame period change during the screen scrolling period.

Further, adjusting, frame by frame, the current frame period corresponding to the current frame rate of the screen based on the frame period change during the screen scrolling period includes: determining a product of the frame period change and n−1; determining a difference between the current frame period and the product; and adjusting an n-th frame period during the screen scrolling period to the difference. In an embodiment, adjusting the current frame rate of the screen frame by frame during the screen scrolling period may be expressed as: during the screen scrolling period, n-th frame period=current frame period−(n−1)*frame period change. Here, the current frame period corresponds to a frame rate of the screen at a current scrolling start time point of the screen.

In another embodiment, adjusting, frame by frame, the current frame period corresponding to the current frame rate of the screen based on the frame period change during the screen scrolling period may also be understood as that during the screen scrolling period, each frame period differs from a frame period immediately before the frame period by one frame period change.

In an embodiment, when the current frame rate is greater than the predetermined target frame rate, the current frame period is prolonged, frame by frame, based on the frame period change. When the current frame rate is greater than the predetermined target frame rate, the current frame rate needs to be reduced. The frame rate may be reduced by adding a frame period to the current frame period. More specifically, when the current frame rate is greater than the predetermined target frame rate, the determined frame period change is negative. The n-th frame period, which is determined based on the difference between the current frame period and the product of the frame period change and n−1, is longer than the current frame period. That is, the frame period is added to the current frame period. Similarly, when the current frame rate is smaller than the predetermined target frame rate, the current frame period is shortened, frame by frame, based on the frame period change. When the current frame rate is smaller than the predetermined target frame rate, the current frame rate needs to be increased. The frame rate may be increased by deducting a frame period from the current frame period. More specifically, when the current frame rate is smaller than the predetermined target frame rate, the determined frame period change is positive. The n-th frame period, which is determined based on the difference between the current frame period and the product of the frame period change and n−1, is shorter than the current frame period. That is, the frame period is deducted from the current frame period.

With the frame rate adjusting method for the display screen according to the above embodiments, the current frame rate is adjusted, frame by frame, at a fixed value based on the determined frame period change. During a frame rate adjustment, an adjustment to the frame rate is smaller near a start time point (the scrolling start time point of the screen), and the current frame period is adjusted, frame by frame, based on a frame period of a previous frame. By adjusting the frame rate frame by frame, an impact of the frame rate adjustment on the user's experience can be mitigated as much as possible. When the current frame rate is greater than the predetermined target frame rate, a number of times of rendering and synthesizing frames should be minimized without affecting the user experience.

With the frame rate adjusting method for the display screen, the predetermined frame-rate-adjustment condition is set. When the screen scrolling speed satisfies the predetermined frame-rate-adjustment condition, the frame period change is calculated based on the obtained current frame rate, the predetermined target frame rate, and the screen scrolling time length, and the current frame rate is adjusted based on the frame period change. With the above method, appropriately adjusting the frame rate of the screen when the predetermined frame-rate-adjustment condition is satisfied can meet diversified needs, and achieve a power-saving effect by adjusting, when the content displayed on the screen changes quickly, the frame rate.

Figure 2:
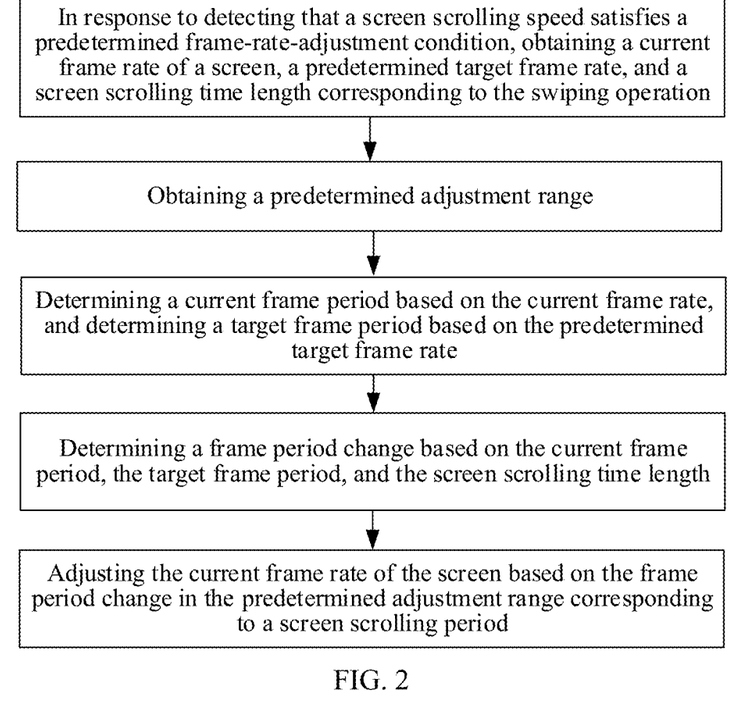
FIG. 2 is a schematic flowchart illustrating a frame rate adjusting method for a display screen according to another embodiment.

FIG. 2 is a schematic flowchart illustrating a frame rate adjusting method for a display screen according to another embodiment. As illustrated in FIG. 2, in this embodiment, the method further includes obtaining a predetermined adjustment range. In this embodiment, adjusting the current frame rate of the screen based on the frame period change during the screen scrolling period includes: adjusting the current frame rate of the screen based on the frame period change within the predetermined adjustment range corresponding to the screen scrolling period.

In this embodiment, an adjustment range is set in advance and recorded as the predetermined adjustment range. The predetermined adjustment range is a range for specifying frame rates to be adjusted during the screen scrolling period. The predetermined adjustment range may be adjusted as desired.

Figure 3:
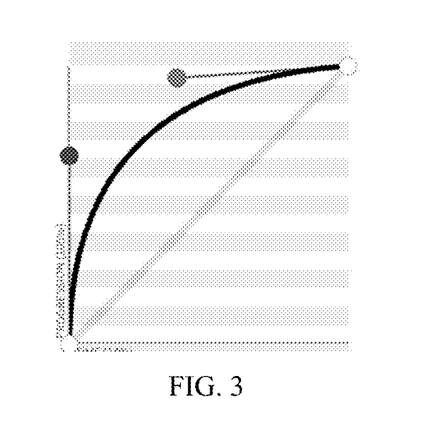
FIG. 3 is a schematic diagram showing an animation interpolation curve for screen scrolling according to a specific embodiment.

In an embodiment, the screen scrolling speed varies at different time points during the screen scrolling period. It can be observed from an animation interpolation curve that the screen scrolling speed during the screen scrolling period is first fast and then slow. FIG. 3 is a schematic diagram showing an animation interpolation curve for screen scrolling according to an optional embodiment. As illustrated in FIG. 3, when the screen starts scrolling, the speed is the fastest and a distance moved per frame is long. The screen scrolling speed decreases and the distance moved per frame reduces as approaching to an end of the animation, until the animation ends. For the sake of the user experience, the predetermined adjustment range may be set. In an embodiment, a predetermined coffe value is used to specify a range of a frame-by-frame adjustment. For example, a coffe of 0.6 means that frame rates of the first 60% of the entire screen scrolling period are changed at a fixed value.

With the method according to the above embodiment, by adjusting frame rates of the predetermined adjustment range of the screen scrolling period, e.g., changing frames in a range of the screen scrolling period where the animation changes fast, and maintaining a high frame rate when a change speed of the animation slows during the screen scrolling period, it is ensured that a frame number may return to its maximum value when the scrolling speed slows. After calculation, when the current frame rate is 120 Hz and the target frame rate is 60 Hz, coffe takes a value range of (0,1], which corresponds to a frame reduction ratio of (0, 33.59%).

In an embodiment, adjusting the current frame rate of the screen based on the frame period change during the screen scrolling period includes: transmitting the frame period change to a DispSync thread during the screen scrolling period, and adjusting a period for transmitting a software vertical synchronization signal by the DispSync thread based on frame period change. The software vertical synchronization signal is used for synthesizing and rendering a frame.

In Android system, a DispSync thread is used by a SurfaceFlinger process to transmit software-simulated Vsync signals, which are used to wake up AppEventThread and SFEventThread every once in a while to make them work. AppEventThread is used to render frames and SFEventThread is used to synthesize frames.

Figure 4:
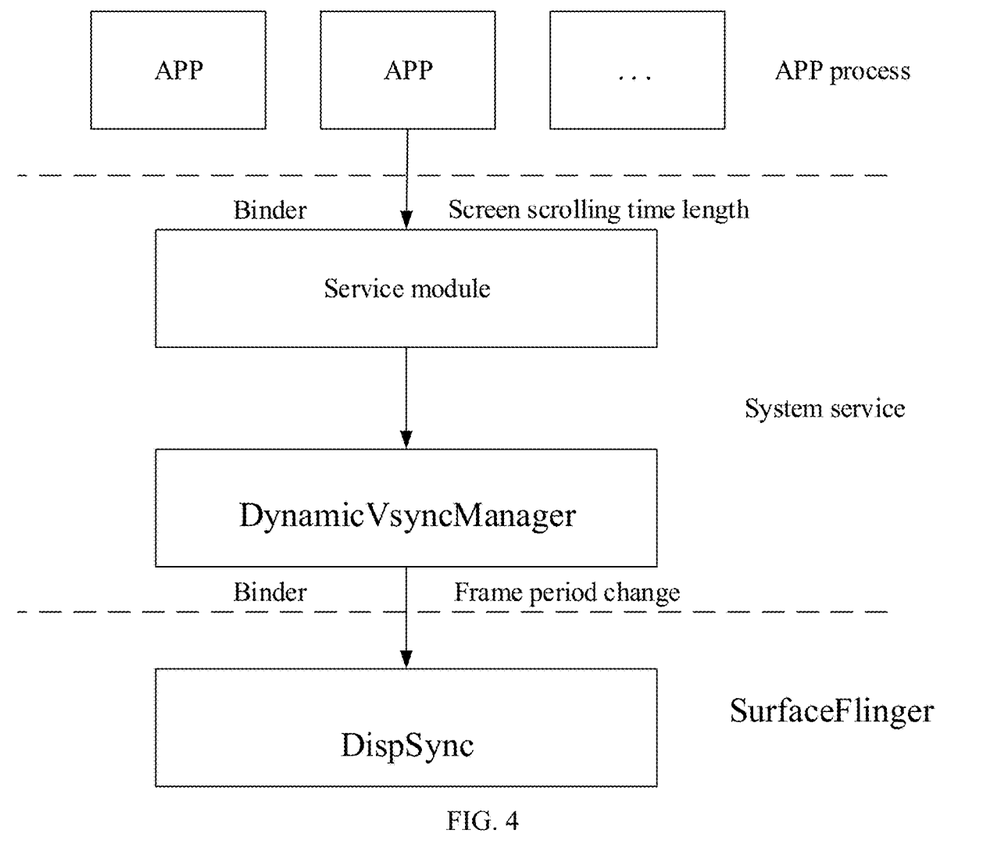
FIG. 4 is a schematic diagram showing an implementation architecture of a frame rate adjusting method for a display screen according to a specific embodiment.

FIG. 4 is a schematic diagram showing an implementation architecture of a frame rate adjusting method for a display screen according to an embodiment. As illustrated in FIG. 4, App is an application process corresponding to the display screen, and the frame rate adjustment is triggered by an event tracking that is added in OverScroller (an Android swipe helper class) and other places. The frame rate adjustment is handed over, via Binder communication, to DynamicVsyncManager (a Vsync dynamic manager) in a SystemServer process for calculating parameters of a final dynamic frame rate. Then, these parameters are transmitted to and applied in DispSync in SurfaceFlinger (which is used to receive and synthesize graphics data from a number of sources, and then transmit the synthesized graphics data to a display device) via Binder.

In an embodiment, when the detected screen scrolling speed satisfies the predetermined frame-rate-adjustment condition, the screen scrolling time length is obtained, via a service module of the Binder, from an application process and transmitted to DynamicVsyncManager of Binder. Also, DynamicVsyncManager obtains the current frame rate and the predetermined target frame rate, calculates the frame period change based on the current frame rate, the predetermined target frame rate, and the screen scrolling time length, and transmits the frame period change to DispSync for DispSync to adjust, based on the frame period change, a time interval for transmitting a software Vsync signal.

Further, exemplarily, when it is detected that the screen scrolling speed satisfies the predetermined frame-rate-adjustment condition, the obtained current frame rate is recorded as fps, the predetermined target frame rate is recorded as minfps, the screen scrolling time length is recorded as duration, the frame period change to be determined is recorded as incPeriod, the current frame period determined based on the current frame rate fps is recorded as maxPeriod, the target frame period determined based on minfps is recorded as targetPeriod, and the number of frames to be displayed during the screen scrolling period is recorded as frame.

fps=1,000/period;

$C$=maxPeriod=1,000/minFps;

targetPeriod=$C$−incPeriod*(frame−1); and duration=$C$+($C$−incPeriod)+($C$−2*incPeriod)+ . . . +[($C$−(frame−1)*incPeriod].

From the above equations, it can be calculated that:

incPeriod=($C$^2−targetPeriod^2)/(2*duration−$C$−targetPeriod).

Figure 5:
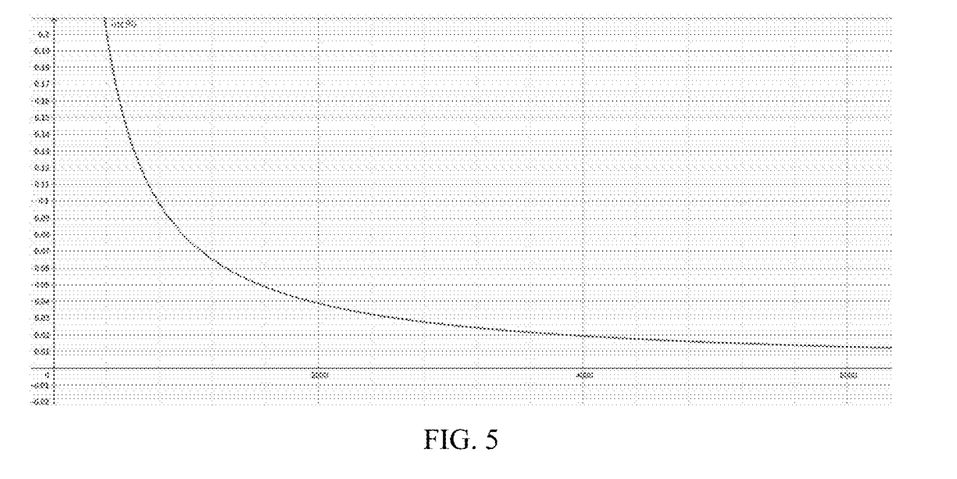
FIG. 5 is a schematic diagram showing a curve of a relationship between a frame period change and time according to a specific embodiment.

In practice, since a scrolling speed corresponding to an interpolated animation during the screen scrolling period is first fast and then slow, the frame period may be set to a minimum value at the beginning of scrolling of the interpolated animation, and may be prolonged frame by frame subsequently. The maximum frame rate is set to 90 Hz and the minimum frame rate is set to 60 Hz, a curve of incPeriod versus time is therefore as illustrated in FIG. 5 below.

Further, a value of coffe is set to 0.6, which specifies that the frame rate adjustment is performed in a range of the first 60% of the screen scrolling period.

With the frame rate adjusting method for the display screen described above, the frame rate of the display screen is adjusted when certain conditions are satisfied. By the above method, a method for implementing a dynamic frame rate is provided for high-frame rate machines, which assists in achieving the power-saving effect. In addition, by adjusting the frame rate of the display screen within the predetermined adjustment range, the number of times of rendering and synthesizing frames may be minimized without affecting the user's experience, thereby limiting a number of refreshes to solve performance problems of lagging and frame drops.

It should be understood that although steps in each of the flowcharts illustrated in FIG. 1 and FIG. 2 are illustrated in a sequence indicated by an arrow, these steps are not necessarily executed in the sequence indicated by the arrow. Unless explicitly stated herein, execution of these steps is not strictly limited to the sequence, and these steps may be performed in other sequences. In addition, at least a part of the steps in each of FIG. 1 and FIG. 2 may include several sub-steps or several stages. These sub-steps or stages are not necessarily executed and completed at the same time, but may be executed at different times. These sub-steps or stages are also not necessarily executed sequentially one by one, but may be executed in turn or alternately with other steps, or sub-steps of other steps, or at least a part of the stages.

Figure 6:
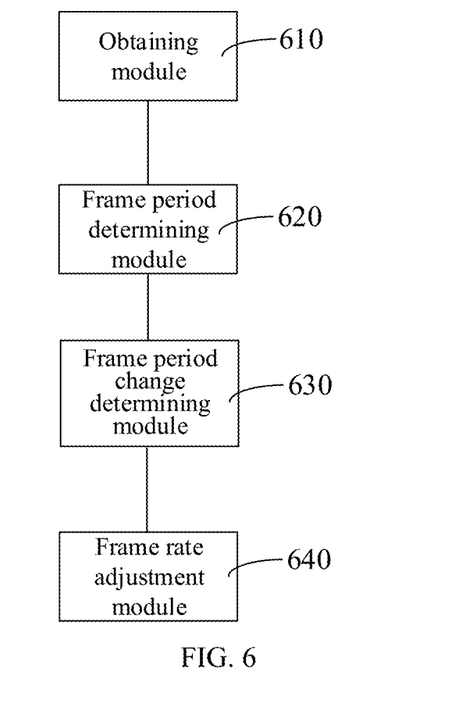
FIG. 6 is a block diagram showing a structure of a frame rate adjusting apparatus for a display screen according to an embodiment.

In an embodiment, as illustrated in FIG. 6, a frame rate adjusting apparatus for a display screen is provided. The apparatus includes a first obtaining module 610, a second obtaining module 620, a frame period determining module 630, a frame period change determining module 640, and a frame rate adjustment module 650.

The first obtaining module 610 is configured to obtain, in response to detecting a swiping operation, a screen scrolling speed corresponding to an end time point of the swiping operation.

The second obtaining module 620 is configured to obtain, in response to the screen scrolling speed satisfying a predetermined frame-rate-adjustment condition, a current frame rate of a screen, a predetermined target frame rate, and a screen scrolling time length corresponding to the swiping operation.

The frame period determining module 630 is configured to determine a current frame period based on the current frame rate, and determine a target frame period based on the predetermined target frame rate.

The frame period change determining module 640 is configured to determine a frame period change based on the current frame period, the target frame period, and the screen scrolling time length.

The frame rate adjustment module 650 is configured to adjust the current frame rate of the screen based on the frame period change during a screen scrolling period. Here, the screen scrolling period includes a time period between a scrolling start time point of the screen and a scrolling end time point of the screen.

With the frame rate adjusting apparatus for the display screen, the predetermined frame-rate-adjustment condition is set. The screen scrolling speed is obtained in response to detecting the swiping operation. The current frame rate, the predetermined target frame rate, and the screen scrolling time length corresponding to the swiping operation on the screen are obtained in response to the screen scrolling speed satisfying the predetermined frame-rate-adjustment condition. The frame period change is calculated and obtained based on the obtained current frame rate, the predetermined target frame rate, and the screen scrolling time length. The current frame rate is adjusted based on the frame period change during the screen scrolling period. By the above method, when the screen scrolling speed satisfies the predetermined frame-rate-adjustment condition, the frame rate of the screen may be appropriately adjusted to meet diverse needs. The frame rate may be adjusted to achieve a power-saving effect when contents displayed on the screen change quickly.

In an embodiment, the obtaining module of the apparatus is further configured to obtain a predetermined adjustment range. In this embodiment, the frame rate adjustment module is configured to adjust the current frame rate of the screen based on the frame period change within the predetermined adjustment range corresponding to the screen scrolling period.

In an embodiment, the frame rate adjustment module of the apparatus is configured to transmit the frame period change to a DispSync thread during the screen scrolling period, and adjust a period for transmitting a software vertical synchronization signal by the DispSync thread based on frame period change. The software vertical synchronization signal is used for synthesizing and rendering a frame.

In an embodiment, the frame rate adjustment module of the apparatus is configured to adjust, frame by frame, the current frame period corresponding to the current frame rate of the screen based on the frame period change during the screen scrolling period.

Further, in an embodiment, the frame rate adjustment module of the apparatus is configured to: determine a product of the frame period change and n−1; determine a difference between the current frame period and the product; and adjust an n-th frame period during the screen scrolling period to the difference.

For limitations of the frame rate adjusting apparatus for the display screen, reference may be made to limitations of the frame rate adjusting method for the display screen, which will not be repeated here. Each module in the frame rate adjusting apparatus for the display screen may be implemented in whole or in part by software, hardware and a combination thereof. The above modules can be embedded in or independent of the processor in the computer device in the form of hardware, or stored in the memory in the computer device in the form of software, such that the processor can invoke and execute operations corresponding to the above modules.

Figure 7:
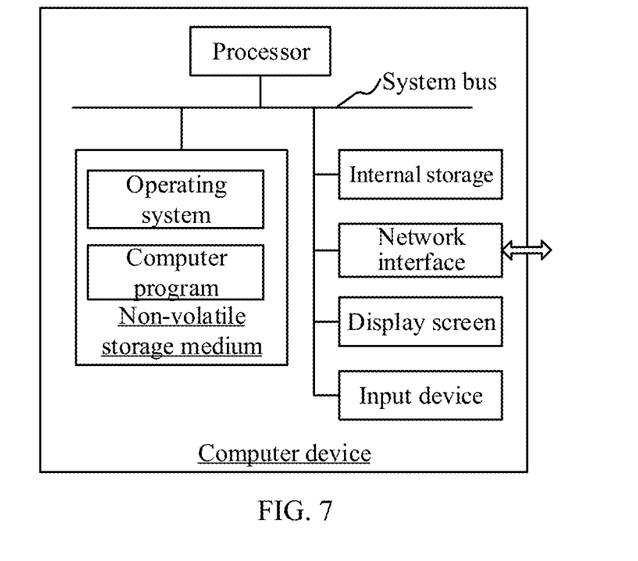
FIG. 7 is a schematic diagram showing an internal structure of a terminal according to an embodiment.

In an embodiment, a computer device is provided. The computer device may be a terminal. An internal structure diagram of the terminal may be as illustrated in FIG. 7. The computer device includes a processor, a storage device, a network interface, a display screen, and an input device that are connected via a system bus. Here, the processor of the computer device is configured to provide computing and control capabilities. The storage device of the computer device includes a non-volatile storage medium and an internal storage. The non-volatile storage medium stores an operating system and a computer program. The internal storage provides an environment for the execution of the operating system and the computer program in the non-volatile storage medium. The network interface of the computer device is configured to communicate with an external terminal through a network connection. The computer program, when executed by the processor, implements the frame rate adjusting method for the display screen. The display screen of the computer device may be a liquid crystal display or an electronic ink display. The input device of the computer device may be a touch layer covering the display screen, or a button, a trackball, or a touch panel arranged on a housing of the computer device, or a keyboard, a touch panel, or a mouse, etc., that is externally connected to the computer device.

Those skilled in the art can understand that the structure illustrated in FIG. 7 is only a block diagram of a partial structure related to the solutions of the present disclosure, and does not constitute a limitation on the computer device to which the solutions of the present disclosure are applied. A specific computer device may include more or fewer components than those illustrated in the figures, or combine certain components, or have a different arrangement of components.

In an embodiment, a computer device is provided. The computer device includes: a memory having a computer program stored thereon; and a processor. The processor is configured to, when executing the computer program, implement steps of: obtaining, in response to detecting a swiping operation, a screen scrolling speed corresponding to an end time point of the swiping operation; in response to the screen scrolling speed satisfying a predetermined frame-rate-adjustment condition, obtaining a current frame rate of a screen, a predetermined target frame rate, and a screen scrolling time length corresponding to the swiping operation; determining a current frame period based on the current frame rate, and determining a target frame period based on the predetermined target frame rate; determining a frame period change based on the current frame period, the target frame period, and the screen scrolling time length; and adjusting the current frame rate of the screen based on the frame period change during a screen scrolling period. Here, the screen scrolling period includes a time period between a scrolling start time point of the screen and a scrolling end time point of the screen.

In an embodiment, the processor is configured to, when executing the computer program, implement steps of: determining, in response to detecting that the screen scrolling speed is greater than a first speed threshold or that the screen scrolling speed is smaller than a second speed threshold at an end of the swiping operation, that the screen scrolling speed satisfies the predetermined frame-rate-adjustment condition. The first speed threshold is greater than the second speed threshold.

In an embodiment, the processor is configured to, when executing the computer program, implement steps that determining the frame period change based on the current frame period, the target frame period, and the screen scrolling time length includes: calculating a difference between a square of the current frame period and a square of the target frame period; calculating a product of the screen scrolling time length and 2, and subtracting the current frame period and the target frame period from the product to obtain a difference; and determining a ratio of the difference between the squares to the difference as the frame period change.

In an embodiment, the processor is configured to, when executing the computer program, implement a step of: obtaining a predetermined adjustment range. In this embodiment, adjusting the current frame rate of the screen based on the frame period change during the screen scrolling period includes: adjusting the current frame rate of the screen based on the frame period change within the predetermined adjustment range corresponding to the screen scrolling period.

In an embodiment, the processor is configured to, when executing the computer program, implement steps of: transmitting the frame period change to a DispSync thread during the screen scrolling period, and adjusting a period for transmitting a software vertical synchronization signal by the DispSync thread based on frame period change. The software vertical synchronization signal is used for synthesizing and rendering a frame.

In an embodiment, the processor is configured to, when executing the computer program, implement steps of: adjusting, frame by frame, the current frame period corresponding to the current frame rate of the screen based on the frame period change during the screen scrolling period.

In an embodiment, the processor is configured to, when executing the computer program, implement steps that: adjusting, frame by frame, the current frame period corresponding to the current frame rate of the screen based on the frame period change includes: determining a product of the frame period change and n−1; determining a difference between the current frame period and the product; and adjusting an n-th frame period during the screen scrolling period to the difference.

In an embodiment, a computer-readable storage medium is provided. The computer-readable storage medium stores a computer program. The computer program, when executed by a processor, implements steps of: obtaining, in response to detecting a swiping operation, a screen scrolling speed corresponding to an end time point of the swiping operation; in response to the screen scrolling speed satisfying a predetermined frame-rate-adjustment condition, obtaining a current frame rate of a screen, a predetermined target frame rate, and a screen scrolling time length corresponding to the swiping operation; determining a current frame period based on the current frame rate, and determining a target frame period based on the predetermined target frame rate; determining a frame period change based on the current frame period, the target frame period, and the screen scrolling time length; and adjusting the current frame rate of the screen based on the frame period change during a screen scrolling period. Here, the screen scrolling period includes a time period between a scrolling start time point of the screen and a scrolling end time point of the screen.

In an embodiment, the computer program, when executed by a processor, further implements steps of: determining, in response to the screen scrolling speed being greater than a first speed threshold or smaller than a second speed threshold, that the screen scrolling speed satisfies the predetermined frame-rate-adjustment condition. The first speed threshold is greater than the second speed threshold.

In an embodiment, the computer program, when executed by a processor, further implements steps that: determining the frame period change based on the current frame period, the target frame period, and the screen scrolling time length includes: calculating a difference between a square of the current frame period and a square of the target frame period; calculating a product of the screen scrolling time length and 2, and subtracting the current frame period and the target frame period from the product to obtain a difference; and determining a ratio of the difference between the squares to the difference as the frame period change.

In an embodiment, the computer program, when executed by a processor, further implements a step of obtaining a predetermined adjustment range. In this embodiment, adjusting the current frame rate of the screen based on the frame period change during the screen scrolling period includes: adjusting the current frame rate of the screen based on the frame period change within the predetermined adjustment range corresponding to the screen scrolling period.

In an embodiment, the computer program, when executed by a processor, further implements steps of: transmitting the frame period change to a DispSync thread during the screen scrolling period, and adjusting a period for transmitting a software vertical synchronization signal by the DispSync thread based on frame period change. The software vertical synchronization signal is used for synthesizing and rendering a frame.

In an embodiment, the computer program, when executed by a processor, further implements steps of: adjusting, frame by frame, the current frame period corresponding to the current frame rate of the screen based on the frame period change during the screen scrolling period.

In an embodiment, the computer program, when executed by a processor, further implements steps that: adjusting, frame by frame, the current frame period corresponding to the current frame rate of the screen based on the frame period change includes: determining a product of the frame period change and n−1; determining a difference between the current frame period and the product; and adjusting an n-th frame period during the screen scrolling period to the difference.

It can be appreciated by those skilled in the art that all or part of the steps in the methods of the above embodiments can be implemented by relevant hardware following instructions of a computer program. The computer program can be stored in a non-volatile computer-readable storage medium, and the computer program, when executed, may include steps of the method according to any one of the above embodiments. Any reference to a memory, a storage, a database, or other media as used herein may include a non-volatile and/or a volatile memory. The nonvolatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) or an external cache memory. By way of illustration, rather than limitation, an RAM is available in various forms such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The technical features of the above embodiments can be combined arbitrarily. In order to make the description concise, not all possible combinations of the technical features of the above embodiments have been described. However, as long as there is no contradiction in a combination of these technical features, the combination should be considered as falling into the scope of this specification.

The above embodiments illustrate merely some implementations of the present disclosure. Although description of the above embodiments is specific and detailed, the description should not be construed as limitations on the scope of the present disclosure. It should be pointed out that, various modifications and improvements can be made by those skilled in the art without departing from the concept of the present disclosure, and shall fall within the protection scope of the present disclosure as defined by the claims as attached.

What is claimed is:

1. A frame rate adjusting method for a display screen, comprising:
    obtaining, in response to detecting a swiping operation, a screen scrolling speed corresponding to an end time point of the swiping operation;
    in response to the screen scrolling speed satisfying a predetermined frame-rate-adjustment condition, obtaining a current frame rate of a screen, a predetermined target frame rate, and a screen scrolling time length corresponding to the swiping operation;
    determining a current frame period based on the current frame rate, and determining a target frame period based on the predetermined target frame rate;
    determining a frame period change based on the current frame period, the target frame period, and the screen scrolling time length; and
    adjusting the current frame rate of the screen based on the frame period change during a screen scrolling period,
    wherein said determining the frame period change based on the current frame period, the target frame period, and the screen scrolling time length comprises:
    calculating a difference between a square of the current frame period and a square of the target frame period;
    calculating a product of the screen scrolling time length and 2, and subtracting the current frame period and the target frame period from the product to obtain a difference; and
    determining a ratio of the difference between the squares to the difference as the frame period change.

2. The method according to claim 1, wherein in response to the screen scrolling speed being greater than a first speed threshold or smaller than a second speed threshold, it is determined that the screen scrolling speed satisfies the predetermined frame-rate-adjustment condition, the first speed threshold being greater than the second speed threshold.

3. The method according to claim 1, wherein the screen scrolling speed and/or the screen scrolling time length is determined based on a scrolling start time point of the screen.

4. The method according to claim 1, further comprising:
    obtaining a predetermined adjustment range;
    wherein said adjusting the current frame rate of the screen based on the frame period change during the screen scrolling period comprises:
    adjusting the current frame rate of the screen based on the frame period change within the predetermined adjustment range corresponding to the screen scrolling period.

5. The method according to claim 1, wherein said adjusting the current frame rate of the screen based on the frame period change during the screen scrolling period comprises:
    transmitting the frame period change to a DispSync thread during the screen scrolling period, and adjusting a period for transmitting a software vertical synchronization signal by the DispSync thread based on frame period change, the software vertical synchronization signal being used for synthesizing and rendering a frame.

6. The method according to claim 1, wherein said adjusting the current frame rate of the screen based on the frame period change during the screen scrolling period comprises:
    adjusting, frame by frame, the current frame period corresponding to the current frame rate of the screen based on the frame period change during the screen scrolling period.

7. The method according to claim 6, wherein said adjusting, frame by frame, the current frame period corresponding to the current frame rate of the screen based on the frame period change during the screen scrolling period comprises:
    determining a product of the frame period change and n−1;
    determining a difference between the current frame period and the product; and
    adjusting an n-th frame period during the screen scrolling period to the difference.

8. The method according to claim 1, wherein said adjusting the current frame rate of the screen based on the frame period change during the screen scrolling period comprises:
    prolonging the current frame period, frame by frame, based on the frame period change, in response to the current frame rate being greater than the predetermined target frame rate; and
    shortening the current frame period, frame by frame, based on the frame period change, in response to the current frame rate being smaller than the predetermined target frame rate.

9. A terminal, comprising:
    a memory having a computer program stored thereon; and
    a processor,
    wherein the processor, when executing the computer program, implements a frame rate adjusting method for a display screen, the method comprising:
    obtaining, in response to detecting a swiping operation, a screen scrolling speed corresponding to an end time point of the swiping operation;
    in response to the screen scrolling speed satisfying a predetermined frame-rate-adjustment condition, obtaining a current frame rate of a screen, a predetermined target frame rate, and a screen scrolling time length corresponding to the swiping operation;

determining a current frame period based on the current frame rate, and determining a target frame period based on the predetermined target frame rate;

determining a frame period change based on the current frame period, the target frame period, and the screen scrolling time length; and adjusting the current frame rate of the screen based on the frame period change during a screen scrolling period, wherein said determining the frame period change based on the current frame period, the target frame period, and the screen scrolling time length comprises:

calculating a difference between a square of the current frame period and a square of the target frame period;

calculating a product of the screen scrolling time length and 2, and subtracting the current frame period and the target frame period from the product to obtain a difference; and determining a ratio of the difference between the squares to the difference as the frame period change.

10. The terminal according to claim 9, wherein in response to the screen scrolling speed being greater than a first speed threshold or smaller than a second speed threshold, it is determined that the screen scrolling speed satisfies the predetermined frame-rate-adjustment condition, the first speed threshold being greater than the second speed threshold.

11. The terminal according to claim 9, wherein the screen scrolling speed and/or the screen scrolling time length is determined based on a scrolling start time point of the screen.

12. The terminal according to claim 9, wherein the method further comprises: obtaining a predetermined adjustment range;

wherein said adjusting the current frame rate of the screen based on the frame period change during the screen scrolling period comprises:

adjusting the current frame rate of the screen based on the frame period change within the predetermined adjustment range corresponding to the screen scrolling period.

13. The terminal according to claim 9, wherein said adjusting the current frame rate of the screen based on the frame period change during the screen scrolling period comprises:

transmitting the frame period change to a DispSync thread during the screen scrolling period, and adjusting a period for transmitting a software vertical synchronization signal by the DispSync thread based on frame period change, the software vertical synchronization signal being used for synthesizing and rendering a frame.

14. The terminal according to claim 9, wherein said adjusting the current frame rate of the screen based on the frame period change during the screen scrolling period comprises:

adjusting, frame by frame, the current frame period corresponding to the current frame rate of the screen based on the frame period change during the screen scrolling period.

15. The terminal according to claim 14, wherein said adjusting, frame by frame, the current frame period corresponding to the current frame rate of the screen based on the frame period change during the screen scrolling period comprises:

determining a product of the frame period change and n−1;

determining a difference between the current frame period and the product; and adjusting an n-th frame period during the screen scrolling period to the difference.

16. The terminal according to claim 9, wherein said adjusting the current frame rate of the screen based on the frame period change during the screen scrolling period comprises:

prolonging the current frame period, frame by frame, based on the frame period change, in response to the current frame rate being greater than the predetermined target frame rate; and shortening the current frame period, frame by frame, based on the frame period change, in response to the current frame rate being smaller than the predetermined target frame rate.

17. A non-transitory computer-readable storage medium, having a computer program stored thereon, wherein the computer program, when executed by a processor, implements a frame rate adjusting method for a display screen, the method comprising:

obtaining, in response to detecting a swiping operation, a screen scrolling speed corresponding to an end time point of the swiping operation;

in response to the screen scrolling speed satisfying a predetermined frame-rate-adjustment condition, obtaining a current frame rate of a screen, a predetermined target frame rate, and a screen scrolling time length corresponding to the swiping operation;

determining a current frame period based on the current frame rate, and determining a target frame period based on the predetermined target frame rate;

determining a frame period change based on the current frame period, the target frame period, and the screen scrolling time length; and adjusting the current frame rate of the screen based on the frame period change during a screen scrolling period, wherein said determining the frame period change based on the current frame period, the target frame period, and the screen scrolling time length comprises:

calculating a difference between a square of the current frame period and a square of the target frame period;

calculating a product of the screen scrolling time length and 2, and subtracting the current frame period and the target frame period from the product to obtain a difference; and determining a ratio of the difference between the squares to the difference as the frame period change.

18. The non-transitory computer-readable storage medium according to claim 17, wherein in response to the screen scrolling speed being greater than a first speed threshold or smaller than a second speed threshold, it is determined that the screen scrolling speed satisfies the predetermined frame-rate-adjustment condition, the first speed threshold being greater than the second speed threshold.

* * * * *